(12) United States Patent
Keast

(10) Patent No.: US 7,391,586 B2
(45) Date of Patent: Jun. 24, 2008

(54) SERVOWRITER RAMP DETECTION

(75) Inventor: L. Michael Keast, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/541,086

(22) Filed: Sep. 29, 2006

(65) Prior Publication Data

US 2007/0076317 A1 Apr. 5, 2007

Related U.S. Application Data

(60) Provisional application No. 60/722,827, filed on Sep. 30, 2005.

(51) Int. Cl.
G11B 21/02 (2006.01)
G11B 27/36 (2006.01)

(52) U.S. Cl. .......................................... 360/75; 360/31

(58) Field of Classification Search ....................... None
See application file for complete search history.

(56) References Cited

U.S. PATENT DOCUMENTS

| | | | |
|---|---|---|---|
| 5,936,788 A * | 8/1999 | Boutaghou et al. | ............ 360/75 |
| 6,097,559 A | 8/2000 | Ottesen et al. | |
| 6,396,652 B1 | 5/2002 | Kawachi et al. | |
| 6,674,589 B2 * | 1/2004 | Min et al. | ..................... 360/31 |
| 6,721,121 B1 | 4/2004 | Schreck et al. | |
| 6,914,405 B2 | 7/2005 | Bernard et al. | |
| 2003/0193727 A1 | 10/2003 | Fioravanti et al. | |
| 2006/0005403 A1 | 1/2006 | Calfee et al. | |
| 2006/0044658 A1 | 3/2006 | Ma | |
| 2006/0132949 A1 | 6/2006 | Erden et al. | |

* cited by examiner

*Primary Examiner*—K. Wong
(74) *Attorney, Agent, or Firm*—Fellers, Snider, et al.

(57) ABSTRACT

A detect control device is provided that monitors a position error signal signature associated with a transducer while being operably supported by an actuator at a substantially constant fly height adjacent a storage medium to characterize the extent to which the actuator contacts an unload ramp. A method is provided for: supporting a transducer at an end of an actuator at a substantially constant fly height adjacent a storage medium; moving the actuator toward an unload ramp while maintaining the substantially constant fly height; and detecting a contacting engagement between the actuator and the unload ramp by monitoring a position error signal signature associated with the transducer.

21 Claims, 7 Drawing Sheets

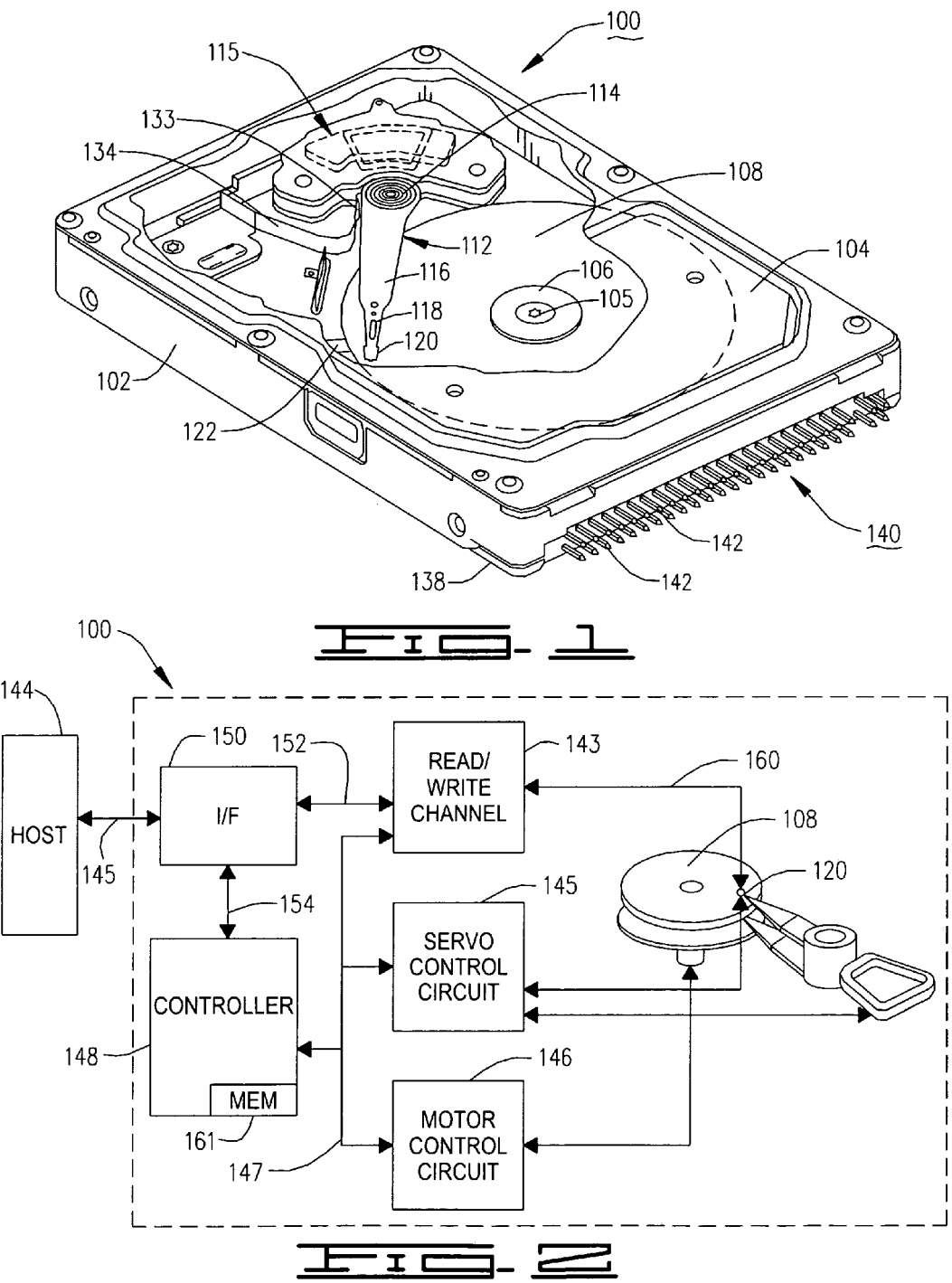

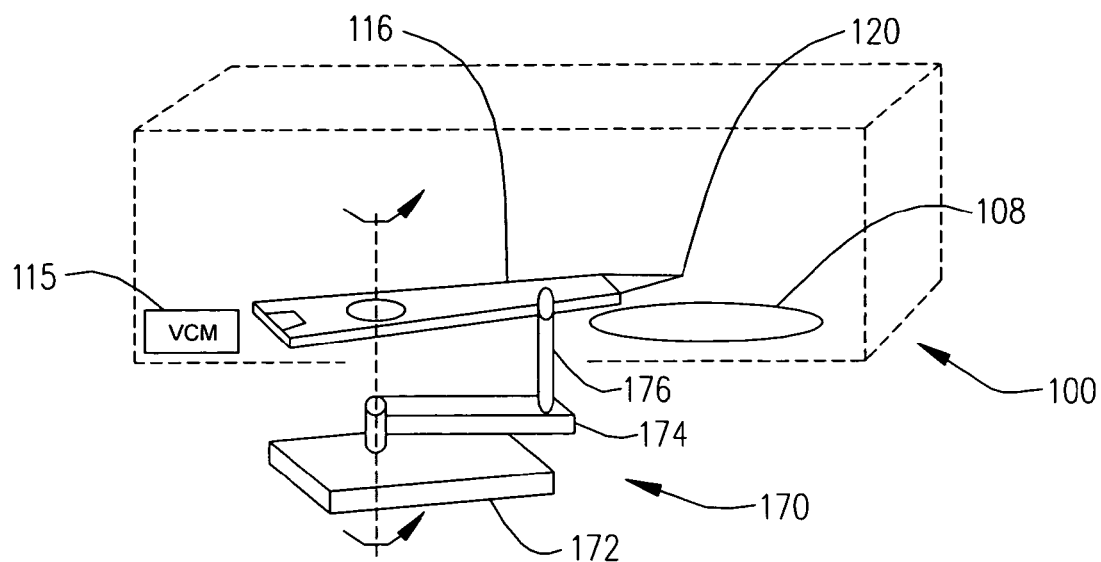
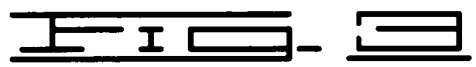
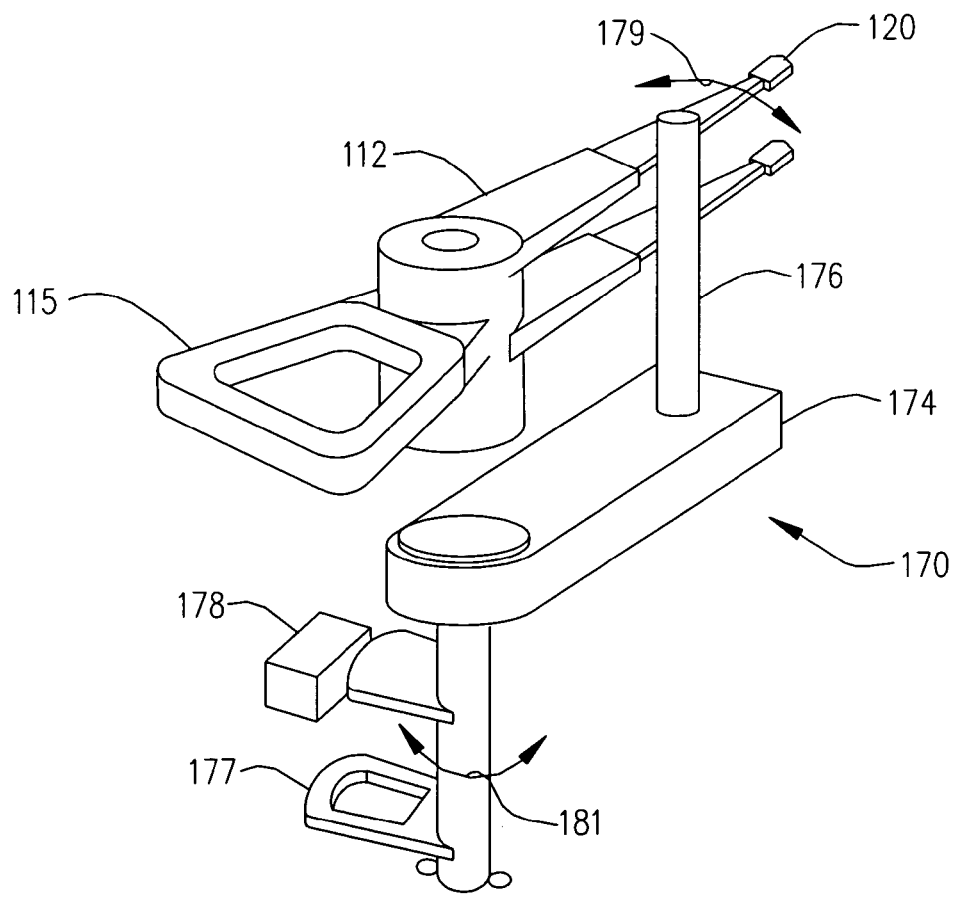
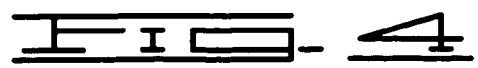

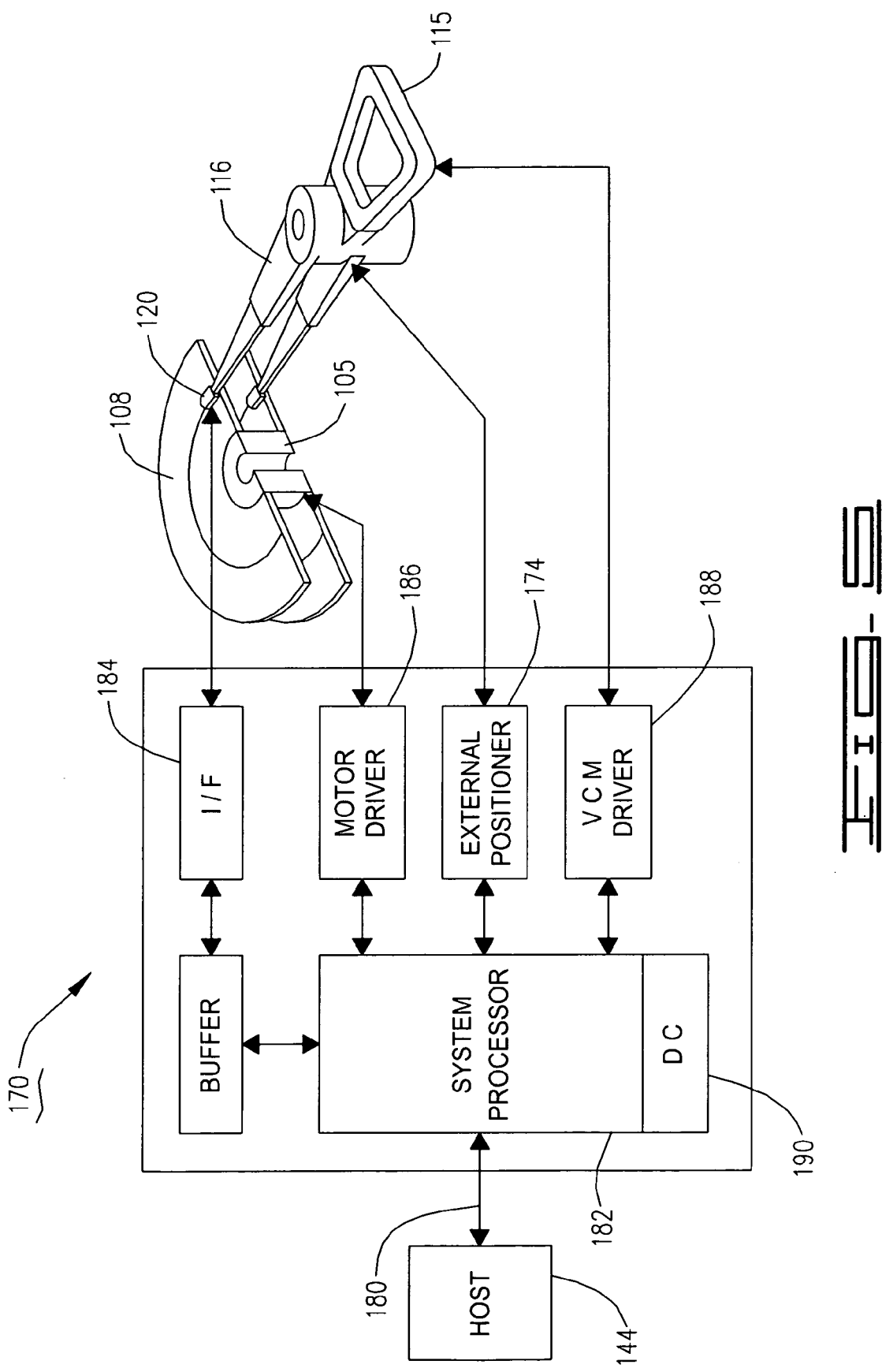

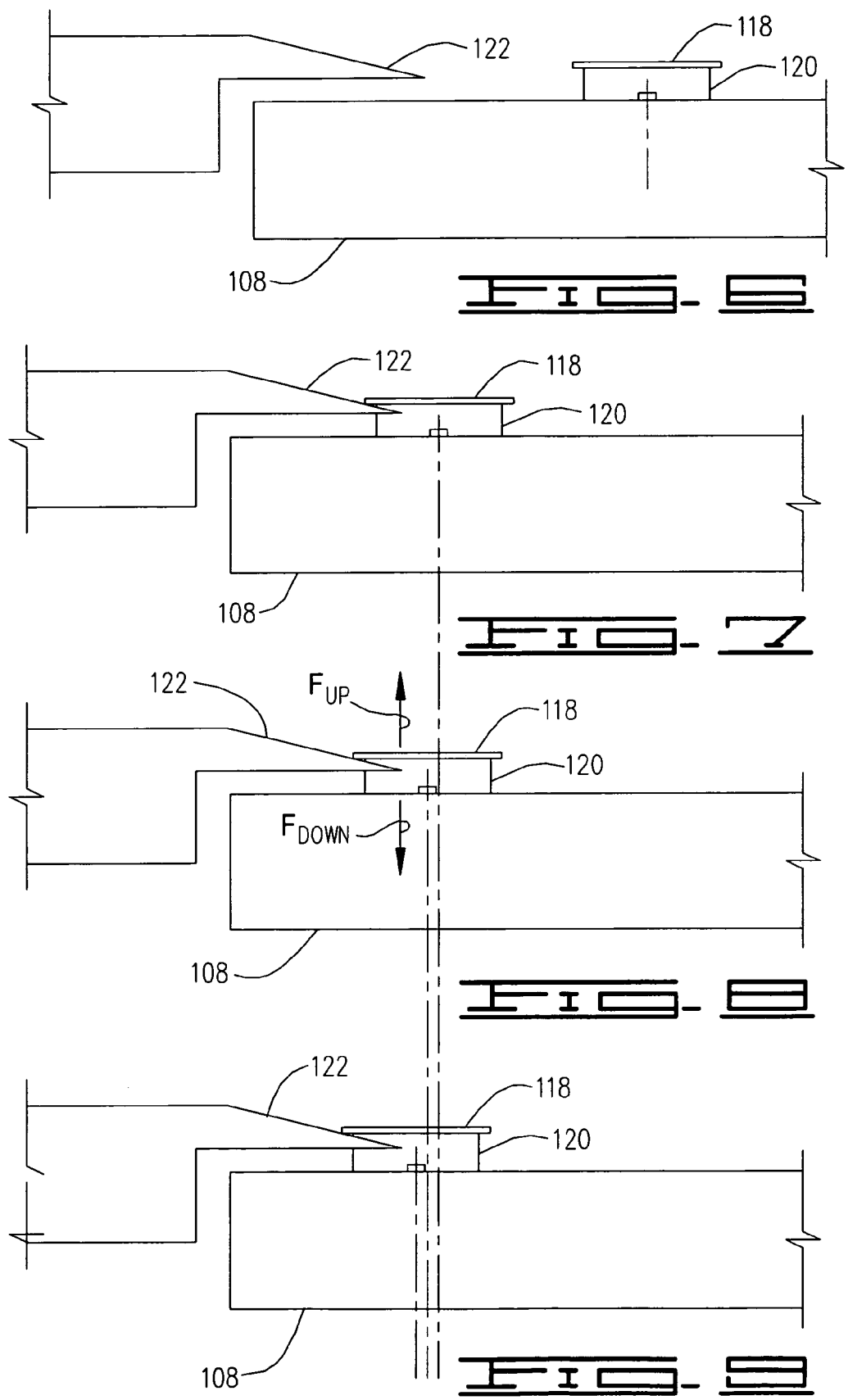

SERVOWRITER RAMP DETECTION

RELATED APPLICATIONS

The present application makes a claim of domestic priority to U.S. Provisional Patent Application No. 60/722,827 filed Sep. 30, 2005.

FIELD OF THE INVENTION

The claimed invention relates generally to the field of data storage and more particularly, but not by way of limitation, to an apparatus and method for writing servo information to a data storage medium.

BACKGROUND

Disc drives are data storage devices that store digital data in magnetic form on a rotating disc. Modem disc drives comprise one or more storage discs that are coated with a magnetizable medium and mounted on the hub of a spindle motor for rotation at a constant high speed. Information is stored on the discs in a plurality of tracks, typically by an array of transducers ("heads") mounted to a radial actuator for movement of the heads relative to the discs. During a write operation data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per millimeter). Increased track density requires more closely-spaced, narrow tracks, and therefore requiring enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo track writer ("STW") during the manufacture of the disc drive. The STW records servo patterns on the discs following assembly of the disc drive. The STW receivingly engages a disc drive that has a disc pack with mounted discs that have not been completely pre-recorded with servo patterns. The STW essentially uses the drive's own read/write heads to record the requisite servo patterns directly to the mounted discs.

These and other recent improvements in the art have significantly improved both, often competing, goals of enhanced quality and faster throughput. It is to the furthering of those efforts that the embodiments of the present invention are directed.

SUMMARY OF THE INVENTION

Embodiments of the present invention are generally directed to the writing of servo information to a moving media data storage device.

In some embodiments a detect control device is provided that monitors a position error signal signature associated with a transducer while being operably supported by an actuator at a substantially constant fly height adjacent a storage medium to characterize the extent to which the actuator contacts an unload ramp.

In some embodiments a method is provided for: supporting a transducer at an end of an actuator at a substantially constant fly height adjacent a storage medium; moving the actuator toward an unload ramp while maintaining the substantially constant fly height; and detecting a contacting engagement between the actuator and the unload ramp by monitoring a position error signal signature associated with the transducer.

In some embodiments an apparatus is provided with an actuator supporting a transducer in a data transfer relationship with a storage medium, and means for characterizing the extent to which the actuator contacts an unload ramp while flying the transducer at a substantially constant fly height adjacent the medium.

In some embodiments a servo writer apparatus is provided having an external positioner that contactingly positions an actuator of a data storage device. The apparatus further has a detect control that monitors a position error signal signature associated with the external positioner to characterize the extent to which the actuator contacts an unload ramp.

In some embodiments a method is provided including: contactingly engaging an external positioner against an actuator of a data storage device; moving the actuator toward an unload ramp by actuating the external positioner; and monitoring a position error signal signature associated with the external positioner to characterize the extent to which the actuator is contacting the unload ramp.

These and various other features and advantages which characterize the claimed invention will become apparent upon reading the following detailed description and upon reviewing the associated drawings.

BRIEF DESCRIPTION OF THE DRAWINGS

FIG. 1 is an isometric view of a data storage device with which embodiments of the present invention can be practiced.

FIG. 2 is a control block diagram of the data storage device of FIG. 1.

FIG. 3 is a diagrammatic depiction of a servo track writer (STW) receivingly engaging a data storage device in accordance with embodiments of the present invention.

FIG. 4 is a more detailed depiction of a portion of the STW of FIG. 3.

FIG. 5 is a control block diagram of the STW of FIG. 3.

FIG. 6 is a graphical depiction of obtaining a baseline PES signature when the head is flying at a nominal fly height and the actuator is not contacting the ramp.

FIG. 7 is a graphical depiction of obtaining a PES signature when the head first contacts the ramp while still flying at the nominal fly height of FIG. 6.

FIG. 8 is a graphical depiction of obtaining a PES signature when the head has stepped into the ramp more than in FIG. 7.

FIG. 9 is a graphical depiction of obtaining a PES signature when the head has stepped into the ramp more than in FIG. 8.

DETAILED DESCRIPTION

Figure 10:
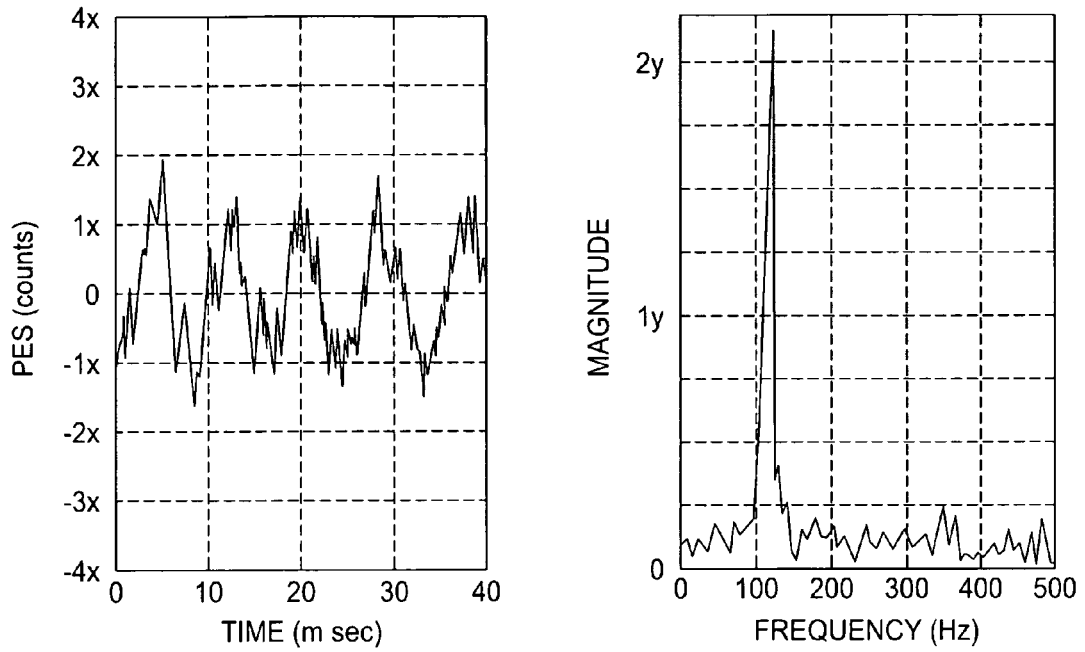
FIG. 10 is an indicative PES signature when the head is at the position of FIG. 6.

Referring to the drawings in general, and more particularly to FIG. 1 that shows an isometric view of a data storage device 100 (or "drive") constructed in accordance with embodiments of the present invention. The drive 100 preferably includes a base 102 and a cover 104 (partially cutaway), which together provide a housing for a number of components. The components include a motor 105 to which a clamp 106 is attached for fixing one or more storage mediums 108 (or "discs") in rotation therewith. Adjacent the disc 108 is an actuator 112 that is pivotable around a bearing assembly 114 by selectively energizing a voice coil motor ("VCM") 115. The actuator 112 includes an arm 116 supporting a load arm 118 that, in turn, supports a head 120 (or "transducer") at a distal end thereof in a data transfer relationship with the disc 108. The heads 120 are moved beyond an outer diameter of the discs 108 and unloaded to a ramp 122 when the drive 100 is inactive. Each disc 108 can be divided into data tracks, and the head 120 is positioned to retrieve data from and store data to the tracks.

To provide the requisite electrical conduction paths between the head 120 and drive 100 control circuitry, the head 120 advantageously has a flex circuit that is routed on the actuator 112 from the head 120, along the load arm 118 and the arm 116, and to a circuit portion 133 that is supported by a proximal end (sometimes referred to as "E block") of the actuator 112. The circuit portion 133 connects the head 120 flex circuit to another flex circuit 134 which passes through the base 102 to a printed circuit board (PCB) 138. An electrical connector 140 attached to the PCB 138 has a plurality of contacts 142 for connecting the drive 100 to a mating connector (not shown), such as for placing the drive 100 in communication with external control circuitry.

FIG. 2 is a functional block diagram illustrating types of control signals and data transfers that can be passed between the drive 100 and a remote device, such as with a host 144 via a bus 145. The drive 100 generally has a read/write channel 143, a servo control circuit 145, and a motor control circuit 146, all connected by a control bus 147 to a controller 148. An interface circuit 150 is connected to the read/write channel 143 by bus 152 and to the controller 148 by bus 154. The interface circuit 150 serves as a communications interface between the drive 100 and the host device (or other remote device as described below). Generally, in response to an access command from the host 144 and received by the controller 148 from the interface 150, the controller 148 controls the flow of data to and from the disc 108. The read/write channel 143, in turn, provides store and retrieve signals to the head 120 in order to store data to the disc 108 and retrieve data from the disc 108. The head 120 can, for example, provide an analog read signal to the read/write channel 143, which in turn converts the analog read signal to digital form and performs the necessary decoding operations to provide data to the interface circuit 150 for output to the host 144. A buffer 161 exists under the control of the controller 148 in order to temporarily store data associated with host 144 access commands with the disc 108.

FIG. 3 is a diagrammatic depiction of a servo track writer ("STW") 170 that is used in accordance with some embodiments of the present invention to write servo information to the discs 108. The STW 170 generally has a positioning system 172 for precisely rotating an external positioner 174 that can include a push-pin 176. The push-pin 176 is insertable through an opening in the base 102 of the drive 100, for making contacting engagement with the actuator arm 116. In equivalent alternative embodiments the external positioner 174 can provide a noncontacting engagement with the actuator 112, such as by providing a light source in combination with an optical diffraction grating on the actuator 112. Although not particularly shown, the positioning system 172 also includes a position control element, such as an encoder or other interferometer element, and a fixed data transfer element for writing a clock track to the disc 108.

The STW 170 is a manufacturing article that receivingly engages a drive 100 for the purpose of writing some or all of the servo tracks to the discs 108. Once the servo track writing procedure is completed, the drive 100 entirely embodies the article of manufacture; the STW 170 forms no part thereof. Hence, for purposes of this description and meaning of the appended claims, the term "external" such as in "external positioning device," with respect to the drive 100, means an item that is not part of the drive 100.

Preferably, the STW 170 is configured so as to be readily connectable to a drive 100 via a connector mating with the connector 140 (FIG. 1). In this manner the STW 170 has entire access to the on-board control circuitry described in FIG. 2, in the same manner as the host 144 does.

FIG. 4 is a more detailed depiction of a portion of the STW 170 of FIG. 3, illustrating a coil 177 of a VCM in the STW 170 that is selectively energized in order to radially position the external positioner 174. Precise positional control is achieved by a positioner 178 in the STW 170 as the STW VCM is used to radially position the actuator 112. During servo writing operations a bias current is applied to the actuator coil portion of the actuator VCM 115, to maintain a continuous contacting engagement with the external positioner 174 throughout the external positioner 174 range of movement. This contacting engagement provides a transmission path for vibrations from the actuator 112 to the external positioner 174. That is, excitations 179 acting on the actuator 112, such as from airflow perturbations from the spinning discs 108 and/or vibration from the rotating spindle motor 105, are transmitted through the contacting engagement to excitations 181 acting on the STW 170. The excitations 181 can be measured with the positioner 178.

FIG. 5 is a diagrammatic depiction of the host 144, now employed to write servo tracks, in communication with the STW 170 via a bus 180. Key components of the STW 170 include a system microprocessor 182 providing top-level control of all the servo track writing activities, as they are directed by the host 144. An interface 184, motor driver 186, and actuator VCM driver 188 communicate with the interface 150, motor control circuit 146, and servo control circuit 145, respectively, of the data storage device 100 illustrated in FIG. 2. Also shown is the external positioner 174 that contactingly positions the actuator 112 in relation to the discs 108.

A detect control ("DC") 190 is illustrated in the form of programming instructions stored in memory that are executable by the processor 182 for monitoring a position error signal ("PES") signature associated with the excitations 181 acting on the external positioner 174. It will be noted that this PES signature, also referred to herein as a "disturbance signal," is unrelated to any data transfer relationship that may or may not be occurring between the head 120 and the disc 108.

As such, the present embodiments can be practiced with the interface 184 de-energized during a ramp detect routine. This advantageously precludes any opportunity for damaging the head 120 by possible pole tip protrusion issues stemming from lifting the head 120 away from the disc 108 at a time when the head 120 is active.

The STW 170 supplies power to the spindle motor 105 for rotating the discs 108 in a data transfer relationship with the heads 120. The external positioner 174 moves the heads 120, via the contacting engagement of the push-pin 176 with the arm 116 in these illustrative embodiments, across the discs 108 to write servo information.

FIGS. 6-9 illustrate four different radial positions of the head 120 as it is moved across the data storage space and ultimately contacts the ramp 122 during servo writing. In FIG. 6 the head 120 is disposed adjacent the data storage area of the disc 108, such as when the STW 170 is writing servo information to the discs 108. FIG. 7 illustrates the head 120 making a first contacting engagement with the angled surface of the ramp 122. In FIG. 8 the head 120 has been moved a short distance, such as would be measured in STW steps, into the ramp 122. FIG. 9 illustrates the head 120 having been moved a like number of STW steps into the ramp 122.

FIGS. 10-13 graphically depict how the DC 190 effectively characterizes the extent to which the head 120 has encroached into the ramp 122. FIG. 10 graphically depicts a baseline PES signature obtained by the DC 190 when the head 120 is at the position of FIG. 6. The amplitude and frequency of the time domain signal indicates a threshold amount of oscillations resulting primarily from the motor 105 rotation, and perhaps augmented by airflow perturbations acting on the actuator 112 and/or the external positioner 174. The DC 190 preferably includes programming steps for converting the data to a frequency domain, such as by performing a Fast Fourier Transformation of the data. Experimentation during reduction to practice of the present embodiments revealed that the frequency domain spectrum is purely a 1F component, in this case at 120 Hz corresponding to the 7200 RPM motor 105 in the drive 100.

Figure 11:
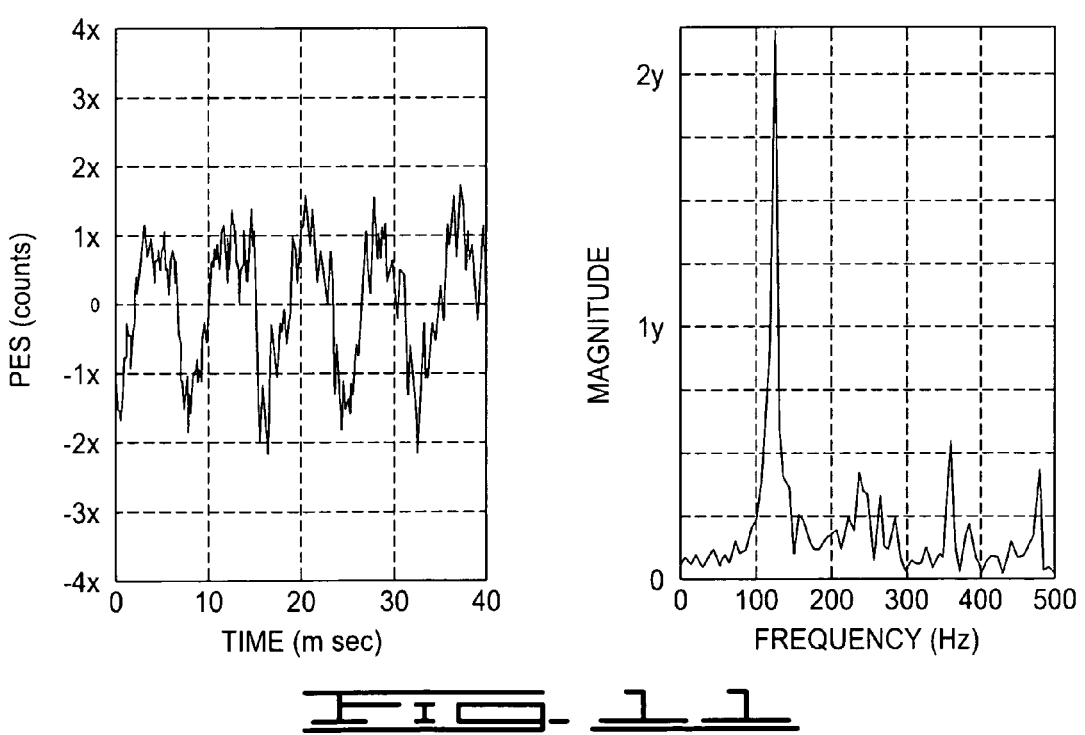
FIG. 11 is an indicative PES signature when the head is at the position of FIG. 7.

FIG. 11 graphically depicts how the PES signature changes instantaneously at the first contacting engagement of the head 120 against the ramp 122. It will be noted that although the contacting engagement is against an inclined surface of the ramp 122, nevertheless it has been observed that the unique characteristics of the PES signature incidental to this initial contacting engagement occur with the head 120 remaining at the nominal fly height as in FIG. 6. This advantageously permits detecting the absolute outer boundary of the data storage area of the disc 108. In some embodiments this advantageously permits using the maximum available data storage space between the inner diameter and the ramp 122. In other embodiments this advantageously permits using the present embodiments to precisely position the head 120, such as for propagating servo tracks. The latter can be especially advantageous when defining the reference position for propagating spiral servo tracks therefrom.

It will be noted by comparing the signature of FIG. 11 to that of FIG. 10 that the frequency of the time domain signal decreases and the amplitude increases at the position of initial contacting engagement. Threshold values for either or both can be determined, either predetermined or empirically defined during servo writing. Current values can then be compared to the threshold to indicate the position of initial contacting engagement. Note also that in the frequency domain spectrum of FIG. 11 harmonic disturbances are evident, in this case at 240 Hz, 360 Hz, and 480 Hz.

Figure 12:
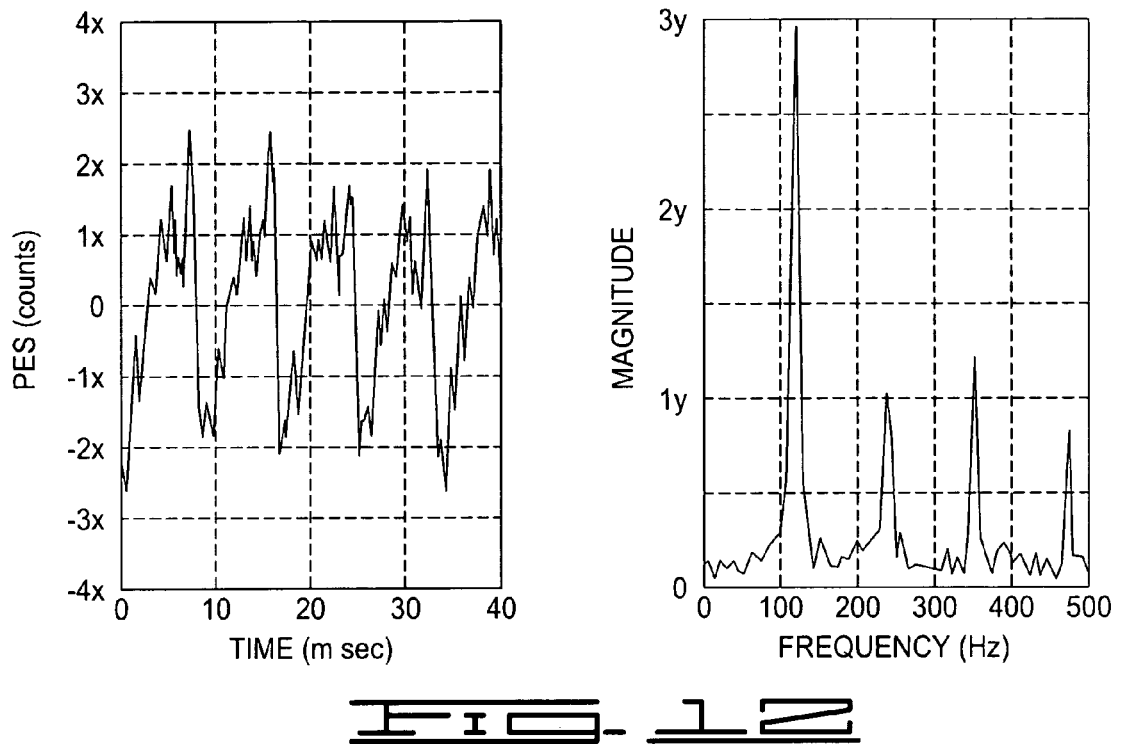
FIG. 12 is an indicative PES signature when the head is at the position of FIG. 8.
Figure 13:
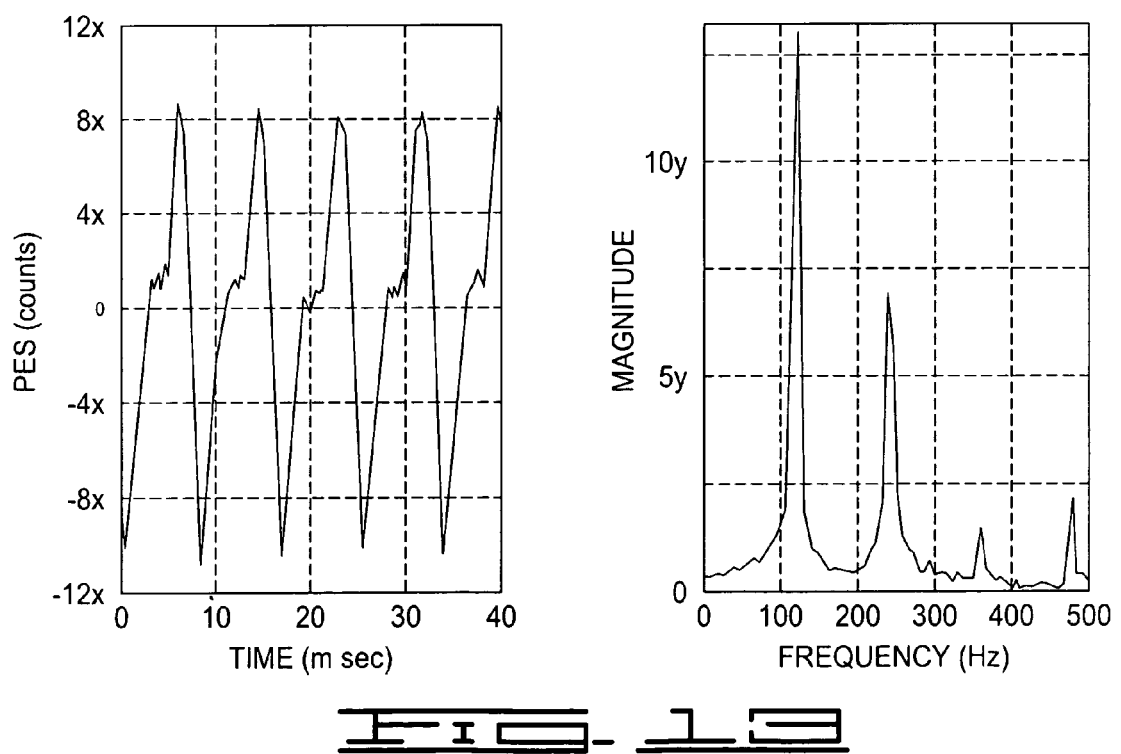
FIG. 13 is an indicative PES signature when the head is at the position of FIG. 9.

FIGS. 12 and 13 graphically depict the PES signatures associated with the head 120 positions of FIGS. 8 and 9, respectively. It has been observed that the amplitudes, both in the time domain and in one or more components of the frequency spectrum, continually increase as the head 120 is lifted away from the disc 108. Experimentation with high-speed photography during reduction to practice of the present embodiments revealed at least one explanation for this phenomena. The lifting force of the inclined ramp 122 has an axial component (in relation to the load arm 118) represented by $F_{up}$ in FIG. 8. The air bearing of the head 120 adjacent the disc 108 creates an opposing negative pressure represented by $F_{down}$ in FIG. 8. These two opposing forces contribute axial forces tending to stretch the load arm 118 and increase the magnitude of the PES signature, as indicated by the changing PES signature characteristics.

Figure 14:
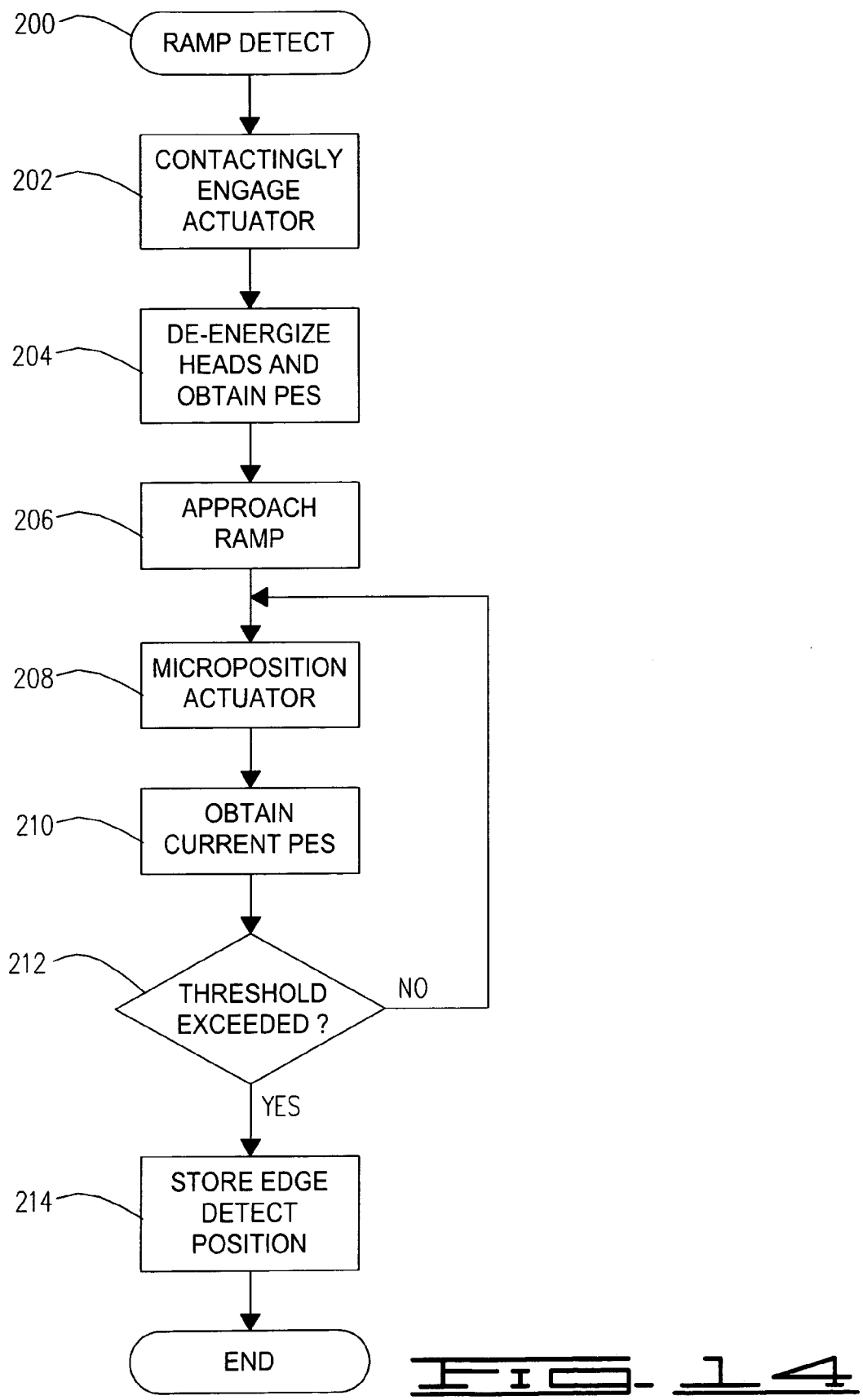
FIG. 14 is a flowchart of steps for practicing a method of RAMP DETECT in accordance with embodiments of the present invention.

FIG. 14 is a flowchart illustrating steps for practicing a method 200 for RAMP DETECT in accordance with the embodiments of the present invention. The method 200 begins in block 202 with the STW 170 contactingly engaging the actuator 112. As described above, preferably a bias current is applied to the drive VCM in order to ensure no separation of this contacting engagement throughout the range of the external positioner 174 movement. In block 204 the DC 190 obtains a threshold PES signature. In some embodiments this threshold can be recalled from memory; alternatively, the threshold can be obtained from readings obtained while the actuator 112 is disposed away from the ramp 122. The latter provides a threshold that advantageously accounts for part-to-part variation amongst different drives 100.

In block 206 the STW 170 moves the actuator 112 near to but short of contacting the ramp 122. The STW 170 then begins micropositioning the actuator 112 toward the ramp 122 in block 208, such as in STW steps. For example, the micropositioning performed in the illustrative embodiments in obtaining data from the position of FIG. 7 to FIG. 8, and from FIG. 8 to FIG. 9, was selected as being 50 STW steps (about 120 microinches).

In block 210 the STW 170 commands the actuator 112 to hold a constant position long enough to obtain the PES signature, and to convert it from time domain to frequency domain information as necessary. In block 212 the DC 190 determines whether the current signature exceeds the threshold. If the determination of block 212 is no, then control returns to block 208. Otherwise, the edge detect position can be stored in block 214 and the method 200 ends. Additionally, the method 200 can include further comparisons of the current PES against expected changes in the signature, such as shown in FIGS. 12-13, to detect the extent to which the actuator 112 is contacting the ramp 122 beyond the initial contacting engagement.

Generally, the embodiments described heretofore contemplate a servo writer apparatus with the external positioner 174 that contactingly positions the actuator 112 in the drive 100 in relation to the discs 108, and means for characterizing the extent to which the actuator 112 contacts the unload ramp 112 independently of storing or retrieving data to or from the discs 108, and while the head 120 remains at a constant fly height. For purposes of this description and meaning of the appended claims, the phrase "means for characterizing" contemplates embodiments employing the structure disclosed herein, including the DC 190, capable of executing the steps of the method 200 for RAMP DETECT of FIG. 14. The claimed embodiments expressly do not contemplate previously attempted solutions such as those employing write and read-back routines for ramp edge detection.

In alternative equivalent embodiments the DC 190 (FIG. 5) can be stored in the memory 161 (FIG. 2) and executed by the controller 148 (FIG. 2) of the data storage device 100 (FIG. 1) itself. This arrangement would advantageously permit the practicing of the present embodiments in a self-servo write operation, where no STW 170 is used to contactingly position the actuator 112. In such alternative embodiments the PES signature would be obtained from the transducer 120 as it is used to position the actuator 112 in relation to pre-existing servo information, such as in the form of preprinted servo or seed tracks of servo information used by the data storage device to propagate servo tracks therefrom.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a servo track writer for writing spiral servo tracks to a data storage device, it will be appreciated by those skilled in the art that the claimed subject matter is not so limited and various other processing systems can be utilized without departing from the spirit and scope of the claimed invention.

What is claimed is:

1. An apparatus comprising a detect control device which monitors a disturbance signal as a transducer is moved at a substantially constant fly height across a storage medium toward a ramp structure, and which detects an initial contact between the ramp structure and an actuator associated with the transducer in relation to an instantaneous change in a frequency component of the disturbance signal, the initial contact occurring while the transducer remains at said substantially constant fly height.

2. The apparatus of claim 1 wherein the detect control device comprises executable instructions stored in a memory.

3. The apparatus of claim 1 wherein the detect control device detects the initial contact with the ramp structure by comparing the disturbance signal to a predetermined threshold.

4. The apparatus of claim 3 wherein the detect control device detects the initial contact with the ramp structure by comparing an amplitude of the disturbance signal to the predetermined threshold.

5. The apparatus of claim 1 wherein the disturbance signal is expressed in a frequency domain as a frequency spectrum signature.

6. The apparatus of claim 5 wherein the detect control device is configured to identify when the actuator is not contacting the ramp structure on the basis of identifying a 1F component in the frequency spectrum signature.

7. The apparatus of claim 5 wherein the detect control device is configured to identify when the actuator is contacting the ramp structure in relation to one or more harmonic components in the frequency spectrum signature.

8. The apparatus of claim 1 further comprising an external positioner that contactingly positions the actuator.

9. The apparatus of claim 8 wherein the external positioner and the actuator maintain a continuous contacting engagement throughout a range of movement of the external positioner to provide a transmission path for vibration from the actuator to the external positioner, and wherein the apparatus further comprises a sensor coupled to the external positioner which generates the disturbance signal in response to said vibration.

10. The apparatus of claim 1 wherein the disturbance signal is generated while the transducer is maintained in a non-data transducing state.

11. A method comprising:
   supporting a transducer at an end of an actuator at a substantially constant fly height adjacent a storage medium;
   moving the actuator toward a ramp while maintaining the substantially constant fly height; and
   detecting an initial contact between the actuator and the ramp during the moving step by monitoring for an instantaneous change in a frequency component of a disturbance signal associated with the transducer, said initial contact occurring while the transducer remains at the substantially constant fly height.

12. The method of claim 11 further comprising characterizing an extent to which the actuator contactingly engages the ramp in relation to changes in the disturbance signal.

13. The method of claim 11 wherein the detecting step comprises comparing an amplitude of the disturbance signal to a predetermined threshold.

14. The method of claim 11 wherein the detecting step comprises converting the disturbance signal from a time domain to a frequency domain.

15. The method of claim 14 wherein a frequency spectrum of the frequency domain representation of the disturbance signal exhibits a 1F component with substantially no higher frequency harmonic components thereof when the actuator is not contacting the ramp.

16. The method of claim 14 wherein the frequency spectrum exhibits one or more harmonic components when the actuator is contacting the ramp.

17. The method of claim 11 further comprising determining a baseline level for the disturbance signal during the moving step when the actuator is not contacting the ramp and using a change in the disturbance signal in relation to the baseline level to detect said initial contact during the detecting step.

18. The method of claim 11 wherein the moving step is characterized by contactingly positioning the actuator with an external positioner.

19. The method of claim 11 further comprising a step of using the detected initial contact to identify a reference position on the storage medium for propagation of servo tracks to the medium.

20. The method of claim 19 wherein the detecting step is characterized by de-energizing the transducer to disable data transfer activity between the transducer and the storage medium while monitoring the position error signal signature.

21. An apparatus comprising:
   an actuator supporting a transducer in a data transfer relationship with a storage medium; and
   means for detecting an initial contact between the actuator and a ramp structure adjacent the storage medium as the actuator is moved in a direction toward the ramp structure while the transducer is at a substantially constant fly height, said initial contact occurring while the transducer remains at said fly height.

* * * * *